United States Patent [19]

Eckert et al.

[11] Patent Number: 5,122,184
[45] Date of Patent: Jun. 16, 1992

[54] MOLTEN SALT COALESCENCE IN MOLTEN ALUMINUM

[75] Inventors: C. Edward Eckert, New Kensington, Pa.; Diran Apelian, Worcester, Mass.; Rajakkannu Mutharason, Broomall, Pa.

[73] Assignee: Aluminum Company of America, Pittsburgh, Pa.

[21] Appl. No.: 635,065

[22] Filed: Dec. 28, 1990

[51] Int. Cl.⁵ .................................................. C22B 9/02
[52] U.S. Cl. ........................................ 75/407; 75/412; 75/678
[58] Field of Search ................................ 75/407, 412, 678

[56] References Cited

U.S. PATENT DOCUMENTS

| | | |
|---|---|---|
| 2,840,463 | 6/1958 | Stroup et al. |
| 2,863,558 | 12/1958 | Brondyke et al. ............ 210/69 |
| 3,025,155 | 3/1962 | Lee et al. |
| 3,039,864 | 6/1962 | Hess et al. |
| 3,737,303 | 6/1973 | Blayden et al. |
| 3,737,304 | 6/1973 | Blayden et al. |
| 3,737,305 | 6/1973 | Blayden et al. |
| 4,067,731 | 1/1977 | Chia ............................. 75/406 |
| 4,384,888 | 5/1983 | Yu. |
| 4,769,158 | 9/1988 | Eckert ........................ 210/780 |
| 4,790,873 | 12/1988 | Gesing et al. .................. 75/412 |

Primary Examiner—Melvyn J. Andrews
Attorney, Agent, or Firm—Andrew Alexander

[57] ABSTRACT

A method of treating molten aluminum containing a suspension of finely divided salt particles remaining after filtering molten aluminum is disclosed. The method comprises providing a body of molten aluminum containing the suspension of molten salt particles entrained therein and passing the molten aluminum into a medium substantially unwettable by the molten salt particles. The particles of salt are collected on the medium and permitted to agglomerate so as to be removed to the surface of the molten aluminum by gravity.

21 Claims, 2 Drawing Sheets

MOLTEN SALT COALESCENCE IN MOLTEN ALUMINUM

BACKGROUND OF THE INVENTION

This invention relates to molten aluminum containing molten salts and more particularly it relates to a method of removing finely divided particles of molten salts from molten aluminum.

In melting aluminum and transferring it, a considerable amount of impurities is often introduced into the melt. These impurities include gas (typically hydrogen from moisture in the atmosphere) non-metallic impurities (mostly being derived from the aluminum oxide film on the melt charge or that which forms on the surface of molten aluminum as it is melted and transported) together with sodium or other metallic impurities which can be introduced in the smelting process. It is important that these impurities be reduced to the minimum levels possible. Gases in the solidified metal produce a number of problems in fabricating and using aluminum products as does the presence of oxides. The gas content and oxide content seem to be related in that oxide particles tend to nucleate the formation of hydrogen filled discontinuities.

The presence of sodium interferes with certain fabrication procedures, especially hot rolling where any significant amount causes severe edge cracking during hot rolling reductions. This is especially significant in alloys containing magnesium, for instance 2 to 10% Mg, where edge cracking becomes very serious.

One example of difficulty in reducing the sodium content by chlorination is that the magnesium present in most aluminum alloy melts is ordinarily reacted simultaneously. This occurs even though chlorine, or the reaction product of chlorine with aluminum, aluminum chloride, react with sodium preferentially over magnesium at equilibrium conditions. From considerations of chemical reaction equilibria and the law of mass section, chlorine released in the melt would first be expected to largely form aluminum chloride because aluminum is by far the major component of the melt. Next in sequence, some of the aluminum chloride may encounter and react with magnesium in the melt to form magnesium chloride because magnesium is usually more concentrated than the other melt components capable of reacting with aluminum chloride. Finally, if contact with the metal is maintained long enough, the magnesium or aluminum chlorides encounter the trace amounts of sodium and react to form the final equilibrium product, sodium chloride. Rate of chlorination and magnesium concentration are factors determining how far and how rapidly reaction proceeds through this sequence to the final equilibrium product, sodium chloride. At commonly used chlorination rates, final equilibrium is difficult to achieve without using contact times which are unacceptable in a continuous commercial process. Accordingly, it has been difficult to achieve extremely low sodium levels under commercial production plant conditions which require comparatively large amounts of molten metal to be treated rather rapidly.

One of the difficulties in achieving extremely low levels of salts is that even after fluxing and filtering some of the molten salt formed can remain in very fine particle form or droplets suspended in the melt and as such becomes extremely difficult to separate by flotation or sedimentation in flowing streams of molten aluminum. Such suspended salt dispersions are of such a nature as to pass through molten metal filters and end up in the aluminum ingot with their attendant problems.

Thus, there is a great need for a process suitable for removing finely divided salt dispersion in molten aluminum. The present invention provides such a process wherein particles or droplets of salt, e.g., smaller than 225 microns, for example, can be effectively coalesced or amalgamated into droplets and which can then be brought to the surface by floatation and removed from the melt.

SUMMARY OF THE INVENTION

Figure 1:
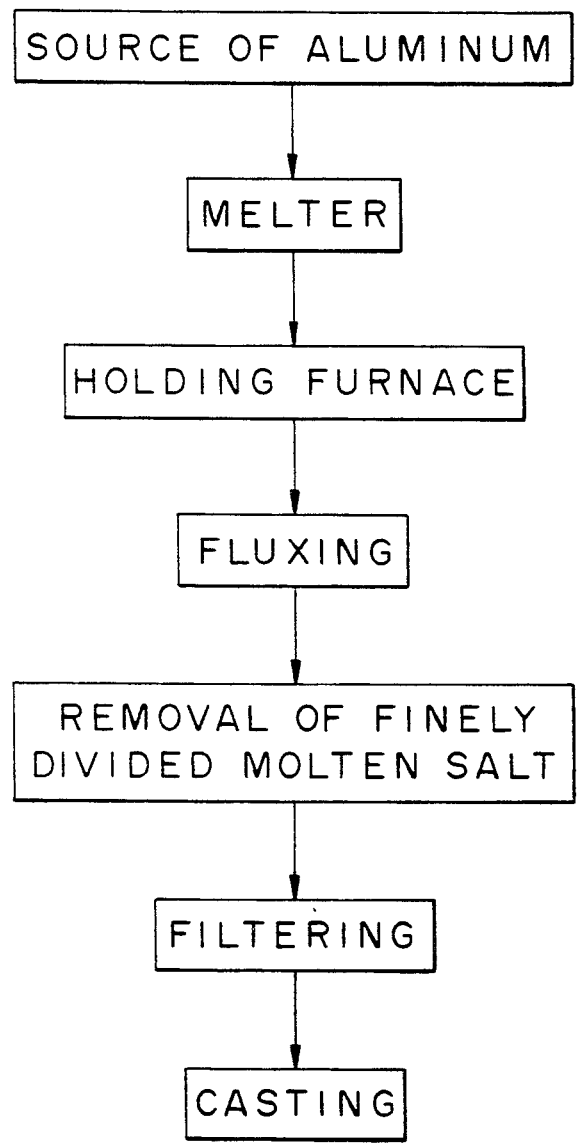
FIG. 1 is a flowsheet illustrating the step prior to and following the removal of finely divided salt.

It is an object of the present invention to coalesce or agglomerate finely divided molten salt particles entrained in molten aluminum.

It is a further object of the present invention to provide a process for coalescing or amalgamating finely molten salt particles entrained in molten aluminum.

Yet a further object of the present invention is to provide an apparatus suitable for coalescing or amalgamating and removing finely divided salt particles or droplets entrained in molten metal.

And yet it is still a further object of the present invention to provide a process for coalescing or amalgamating finely divided salt particles entrained in molten aluminum to provide droplets which can float on the molten aluminum.

These and other objects of the invention will be apparent from the following description and accompanying drawings.

In accordance with these objects, there is provided a method for separating molten salt droplets from molten aluminum, the salt droplets having a size sufficiently small that they remain entrained or suspended in the molten aluminum. The method comprises providing a body of molten aluminum having finely divided salt particles entrained therein and passing a stream of the molten aluminum through an agglomerating medium which is essentially non-wettable by the molten salt. The finely divided particles collect on the medium where they agglomerate to a size which floats on the molten aluminum.

DETAILED DESCRIPTION OF THE INVENTION

In the process of the invention, a source of aluminum is provided (FIG. 1), melted in a melter and then transferred to a holding furnace. Normally, the molten metal is then subjected to a fluxing and/or filtering treatment. The filtering treatment removes entrained solid particles such as aluminum oxide particles, and the fluxing treatment is used to remove dissolved hydrogen as well as lowering the content of metals such as sodium, calcium, magnesium, etc. However, when chlorine or chlorine-containing reactants (i.e., salt injection) are used, the fluxing treatment, as noted earlier, can form salts such as magnesium chloride. A fraction of the salt in the melt can remain as a very finely divided suspension or in an uncoalesced form or state (sometimes referred to as immiscible second phase droplets or particles) and consequently is difficult to remove or separate from the molten aluminum by flotation or gravity separation. That is, even though the salt may have a lower density than the aluminum, it remains entrained in the molten aluminum and can pass through the filtering system with the resultant imperfections in the aluminum ingot. While reference is made to molten immersible second phase droplets or particles of salt, finely divided solid particles of oxide or salt may be included therewith for removal.

By way of illustration and not of limitation, the molten aluminum having salt particles dispersed therein enters a flow chamber of dimensions sufficient to lower the superficial metal velocity to approximately 1–2.5 cm/sec, this requires plan dimensions of about 20 in. × 20 in. for a metal flow rate of 80,000 lbm/hr ($V_o = 1.7$ cm/sec). Since flow is in the Newton regime ($C_D = 0.44$), the smallest spherical salt droplet that would be expected to separate by body forces is given by the following formula:

$$D_d = \frac{3V_o^2 \rho_1 C_D}{4(\rho_d - \rho_1)g}$$

where
$V_o$ = superficial metal velocity, 1.7 cm/sec$^{-1}$
$\rho_1$ = liquid aluminum density, 2.3 g/cm$^{-3}$
$\rho_d$ = salt droplet density, 2.2 g/cm$^{-3}$
$C_D$ = drag coefficient, 0.44
$D_d$ = salt droplet diameter For this illustration, $D_d = 0.224$ mm or 224 microns. Thus, for this example, droplets approximately larger than 0.224 mm would be expected to separate to the metal surface, and salt droplets less than this size would be expected to remain entrained. Thus, the finely divided particles of salt, e.g., less than 224 microns, remain entrained or suspended in the molten aluminum, particularly when molten aluminum is under turbulent flow. These particles resist body force separation or molten metal surface separation, e.g., flotation or buoyant separation, because the particles are in a non-amalgamated or non-coalesced state. However, when a 2-inch thick phosphate bonded high alumina reticulated ceramic foam (pore diameter about 250 to 300 μm) was coated with boron nitride and the flow rate therethrough maintained as above through the chamber (FIG. 2), the subcritical diameter salt droplets consolidate to a size greater than 0.224 μm and collect on the surface of the aluminum. Aluminum ingot formed from the molten aluminum (AA5052) was found to be free of oxide patches which in such an alloy can contain MgO, MgAl$_2$O$_4$ and salt. Particles or droplets of salt which tend to remain entrained have a size generally less than 750 microns, preferably less than 600 microns and are typically less than about 300 microns.

In treating molten aluminum, particularly when such aluminum contains magnesium or is alloyed with magnesium, a magnesium oxide dispersoid can form having a particle size of about 1 to 5 microns. It is believed that the dispersed salts and the magnesium oxide dispersoid-type particles form agglomerates. That is, the magnesium oxide-type particles associate with the salt dispersions or droplets to form agglomerates. Because such agglomerates can behave as a non-Newtonian fluid, the agglomerates are not readily removed from the molten aluminum by conventional filtration because the salt can function as a liquid vehicle for the oxides to migrate through the filtering process with its attendant problems. Thus, it is important to remove the salt from the melt.

With reference to FIG. 1, it will be seen that after the holding furnace, the molten metal is subjected to a fluxing treatment. It is after the fluxing treatment that the molten aluminum can be treated to remove salt dispersions in accordance with the invention. That is, the removal of the salt can be accomplished before the metal passes through the filtering step. However, there are certain instances where it is more expedient to remove the salt dispersions after the filtering step, and such is encompassed within the purview of the present invention.

For molten salt separation purposes from molten metal, e.g., molten aluminum, it is important to note where salt particles have a high form drag, i.e., the vertical terminal velocity of the particle is less than or equal to the local melt velocity, the particle is extremely difficult to separate from the melt by normal sedimentation or flotation. Thus, if separation is to occur, then the local metal velocity has to be low relative to the salt particle terminal velocity in order for the salt particle to separate by slip velocity when the salt particles have coalesced to a sufficiently large size. However, operations of this nature often require impractically large units which operate under laminar flow conditions.

In accordance with the invention, the finely divided salt droplets can be removed by passing the molten aluminum through a member, e.g., a plate or block on which the fine particles can collect and agglomerate, the member having many passages therein and preferably being non-wettable or only having low wettability by the salt. It should be noted that the salt particles do not normally penetrate the plate or block but are collected on the upstream surface where they agglomerate. However, a system may be devised where the salt particles collect and agglomerate on passages inside the plate or block and are collected in the down side stream, and such is contemplated within the purview of the invention. Or, the molten aluminum can be passed through a high porosity reticulated foam which is preferably non-wettable or only having low wettability by the finely divided molten salt particles which provides sites for the finely divided salt particles to collect and coalesce. The preferred plate or block member can be fabricated from boron nitride, alumina coated with boron nitride or zirconia coated boron nitride and can have a number of generally parallel passages therein which have low resistance to flow. Generally, the surface should be non-wetting to salt and be resistant to attack by molten aluminum. The tortuosity of the passages in the plate or block member should be about 1. The plate or block member can have generally parallel passages which are preferred because they offer low flow rate resistance.

For purposes of providing a substantially non-wetting surface for contacting with salt-containing melt, a bed, for example, comprised of Raschig rings, can be provided on which finely divided molten salt particles can collect and agglomerate.

Figure 2:
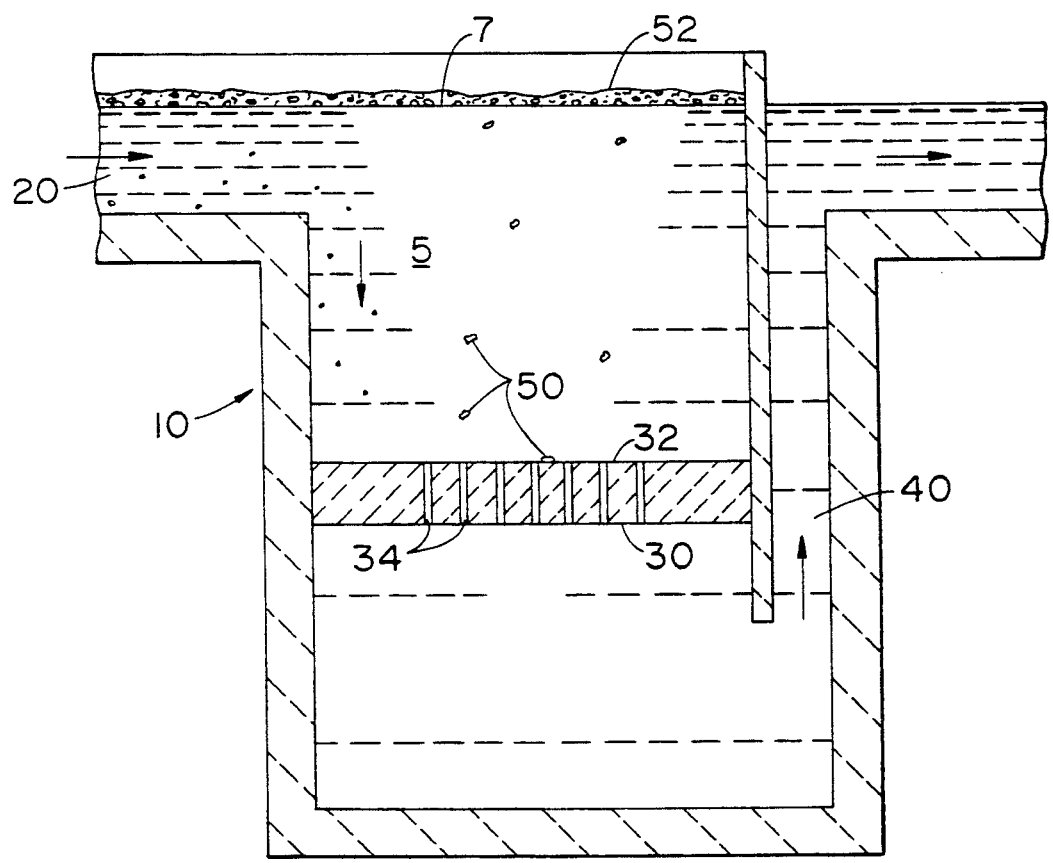
FIG. 2 is a cross section of a vertical housing having a separator located therein for amalgamating or coagulating finely divided dispersions of molten salt particles into drops.

By reference to FIG. 2, there is shown a treatment vessel for removal of entrained finely divided particles of molten salt. Molten aluminum containing entrained finely divided salt flows into chamber or vessel 10 through passage 20. Chamber 10 has mounted therein a plate o block member 30 having substantially parallel openings 32 therein. Molten aluminum leaves chamber 10 along passage 40. Finely divided molten salt particles entrained in the melt collect on surface 32 of member 30. After sufficient collection of droplets or subcritical diameter salt particles occur they agglomerate into drops 50 having a buoyancy which permits them to float to surface 7 of molten aluminum 5 where drops 50 collect as layer 52 and thus can be removed from the melt. Collection of the finely divided molten salt particles on surface 32 occurs as a result of salt/metal interface tension which resists drop formation. Drops 50 can float to the surface of the melt when the incoming velocity of the melt is controlled so as to be lower than the critical velocity which would carry drops 50 through the passages in plate member 30. While the molten metal is shown flowing generally downwardly through vertical passages 34 in horizontal member 30, the molten metal flow may flow horizontally through such passages or at an angle therebetween with similar results and such is contemplated within the purview of the invention. Also, while drops 50 are shown forming on member 30 and rising or floating against the flow of molten metal, the molten metal flow can be controlled so as to permit the finely divided salt particles to collect and form into drops on member 30 and carry the drops through passages 34 where they are thereafter collected as a layer of salt on the molten metal surface or separated by gravity.

While plate 30 is shown in vessel 10 as being horizontal with vertical passages, the plate may be provided in any number of configurations suitable in practicing the invention. In addition, plate or block 30 should be fabricated from a material which is not attacked by nor introduces contaminants to the molten metal. For treating molten aluminum, suitable plate materials are graphite, silicon carbide, carbon, alumina or other materials which do not contaminate molten aluminum. To provide a non-wetting surface, such material can be coated with boron nitride or a like material which provides a highly suitable surface on which the suspended subcritical liquid salt particles can collect and which surface facilitates the agglomeration of the subcritical liquid salt particles.

While the flow may be under turbulent flow conditions, it is not believed that laminar flow conditions are harmful to the separation required. But, it is important that separation or agglomeration can take place while under turbulent flow conditions, and accordingly, there is not believed to be restriction on the type of flow under which the present invention may be used. Accordingly, flow conditions can have Reynolds numbers above 2100 or 2300 with no observable detrimental effect. Counter current flow permits the agglomerate molten salt to collect on surface 7 of molten aluminum in vessel 10.

The size of passages 34 can vary but they should not be so small so as to impede flow of molten metal or become clogged with agglomerated salt. Thus, the size of the openings or passage can be 400 to 1200 microns in diameter, for example. However, this size is simply by way of example. The openings can be greater, if desired. It is important, though, that surface 32 as seen by the incoming molten metal be maximized so as to provide maximum sites for the liquid particles of salts to collect. The length of passages 34 can be short, e.g., 0.5 inch. However, if the passages have cone-shaped configurations so as to become wider in the direction of flow, this can aid in reducing flow restriction of the media.

Member 30 having passages 34 may be replaced with a high porosity reticulated foam on which the subcritical molten salt particles collect and agglomerate to form drops. The reticulated foam may be any material resistant to attack by molten aluminum and is preferably non-wetting by molten salt. Such material may be coated with boron nitride, or the like, which is non-wetting to the molten salt particles or has controlled wetting to the molten salt particles.

Thus, the present invention is useful in removing halide salts resulting from, for example, chloridization of molten aluminum including chloride salts of sodium, calcium, strontium, lithium and magnesium or eutectic, near eutectic or other molten compositions thereof. Typical of the salts that are removed are those which may not be removed by filtering. Typical of the filter beds suitable for removing oxides, other particles or materials such as salt particles not desired in the aluminum ingot is described in U.S. Pat. No. 4,390,364, incorporated herein by reference. Accordingly, the present invention is extremely useful in combination with the filtering processes for molten aluminum.

Thus, molten aluminum treated in accordance with this process is capable of removing the salts to a level which avoids oxide patches on the aluminum ingot.

While the invention has been described with respect to molten aluminum, it will be appreciated that the invention has application to other molten metal systems, such as steels where, for example, molten manganese sulfide can be a problem. Another example of a metal to which the invention can be applied includes magnesium where it is important to remove salt particles.

While the invention has been described in terms of preferred embodiments, the claims appended hereto are intended to encompass other embodiments which fall within the spirit of the invention.

What is claimed is:

1. In a method of treating molten aluminum wherein the molten aluminum is subjected to fluxing and filtering treatments to remove impurities therefrom, said impurities including finely divided molten salt particles, the improvement comprising:
   (a) providing a body of molten aluminum having said salt particles entrained therein, the particles having a size less than 750 μm;
   (b) passing a stream of said molten aluminum through a reticulated ceramic foam having a surface of boron nitride on which the molten salt particles can collect; and
   (c) coalescing said molten salt particles on said boron nitride surface to provide a coalesced salt particle size which separates to a surface of said molten aluminum.

2. A method for separating molten salt particles from molten aluminum to a surface thereof, the method comprising:
   (a) providing a body of molten aluminum having said salt particles entrained therein the particles having a size of less than 750 μm;
   (b) contacting said molten aluminum with a coalescing medium substantially unwettable by molten salt; and
   (c) coalescing said molten salt particles with said medium to provide a size which separates to a surface of said molten aluminum.

3. The method in accordance with claim 1 wherein the molten salt particles have a size of less than 600 μm.

4. The method in accordance with claim 1 wherein the molten salt particles have a size of less than 300 μm.

5. The method in accordance with claim 1 wherein the coalescing medium has a contacting surface of boron nitride.

6. The method in accordance with claim 5 wherein the coalescing medium is reticulated foam.

7. The method in accordance with claim 2 wherein the coalescing medium is fabricated from boron nitride.

8. A method for separating finely dispersed molten salt particles from molten aluminum, the method comprising:
   (a) providing a body of molten aluminum having said salt particles entrained therein, the particles having a size less than 750 $\mu$m;
   (b) passing a stream of said molten aluminum through a reticulated ceramic foam having a surface of boron nitride on which the molten salt particles can collect; and
   (c) coalescing said molten salt particles on said boron nitride surface to provide a coalesced salt particle size which separates to a surface of said molten aluminum.

9. A method of treating molten metal containing a suspension of finely divided molten salt particles therein to remove finely divided particles to a surface thereof, said method comprising:
   (a) providing a body of molten metal containing said suspension of molten salt particles dispersed therein;
   (b) contacting said molten metal with a coalescing medium substantially unwettable by the molten salt particles; and
   (c) collecting particles of said salt on said medium and permitting said particles to agglomerate so as to be removed to a surface of the molten metal by gravity.

10. The method in accordance with claim 9 wherein the finely divided molten salt particles have a size of less than 750 $\mu$m.

11. The method in accordance with claim 9 wherein the finely divided molten salt particles have a size of less than 600 $\mu$m.

12. The method in accordance with claim 9 wherein the finely divided molten salt particles have a size of less than 300 $\mu$m.

13. The method in accordance with claim 9 wherein the coalescing medium has a contacting surface of boron nitride.

14. The method in accordance with claim 13 wherein the coalescing medium is reticulated foam.

15. In a method of treating molten aluminum wherein the molten aluminum is subjected to fluxing and filtering treatments to remove impurities therefrom, said impurities including finely, divided molten salt particles, the improvement comprising:
   (a) providing a body of molten aluminum having said salt particles entrained therein;
   (b) contacting said molten aluminum with a coalescing medium substantially unwettable by molten salt; and
   (c) coalescing said molten salt particles with said medium to provide a size which separates to a surface of said molten aluminum.

16. The method in accordance with claim 15 wherein the finely divided molten salt particles have a size of less than 750 $\mu$m.

17. The method in accordance with claim 15 wherein the finely divided molten salt particles have a size of less than 600 $\mu$m.

18. The method in accordance with claim 15 wherein the finely divided molten salt particles have a size of less than 300 $\mu$m.

19. The method in accordance with claim 15 wherein the coalescing medium has a contacting surface of boron nitride.

20. The method in accordance with claim 19 wherein the coalescing medium is reticulated foam.

21. The method in accordance with claim 15 wherein the coalescing medium is fabricated from boron nitride.

* * * * *

UNITED STATES PATENT AND TRADEMARK OFFICE
CERTIFICATE OF CORRECTION

PATENT NO. : 5,122,184
DATED : June 16, 1992
INVENTOR(S) : C. Edward Eckert, Diran Apelian and Rajakkannu Mutharason It is certified that error appears in the above-identified patent and that said Letters Patent is hereby corrected as shown below:

Col. 1, line 39    Change "section" to --action--.

Col. 4, line 65    After "plate" change "o" to --or--.

Claim 3, col. 6
  line 65    Change "claim 1" to --claim 2--.

Claim 4, col. 6
  line 67    Change "claim 1" to --claim 2--.

Claim 5, col. 7
  line 1    Change "claim 1" to --claim 2--.

Signed and Sealed this

Fourteenth Day of September, 1993

Attest:

BRUCE LEHMAN

Attesting Officer    Commissioner of Patents and Trademarks